Figure 1:
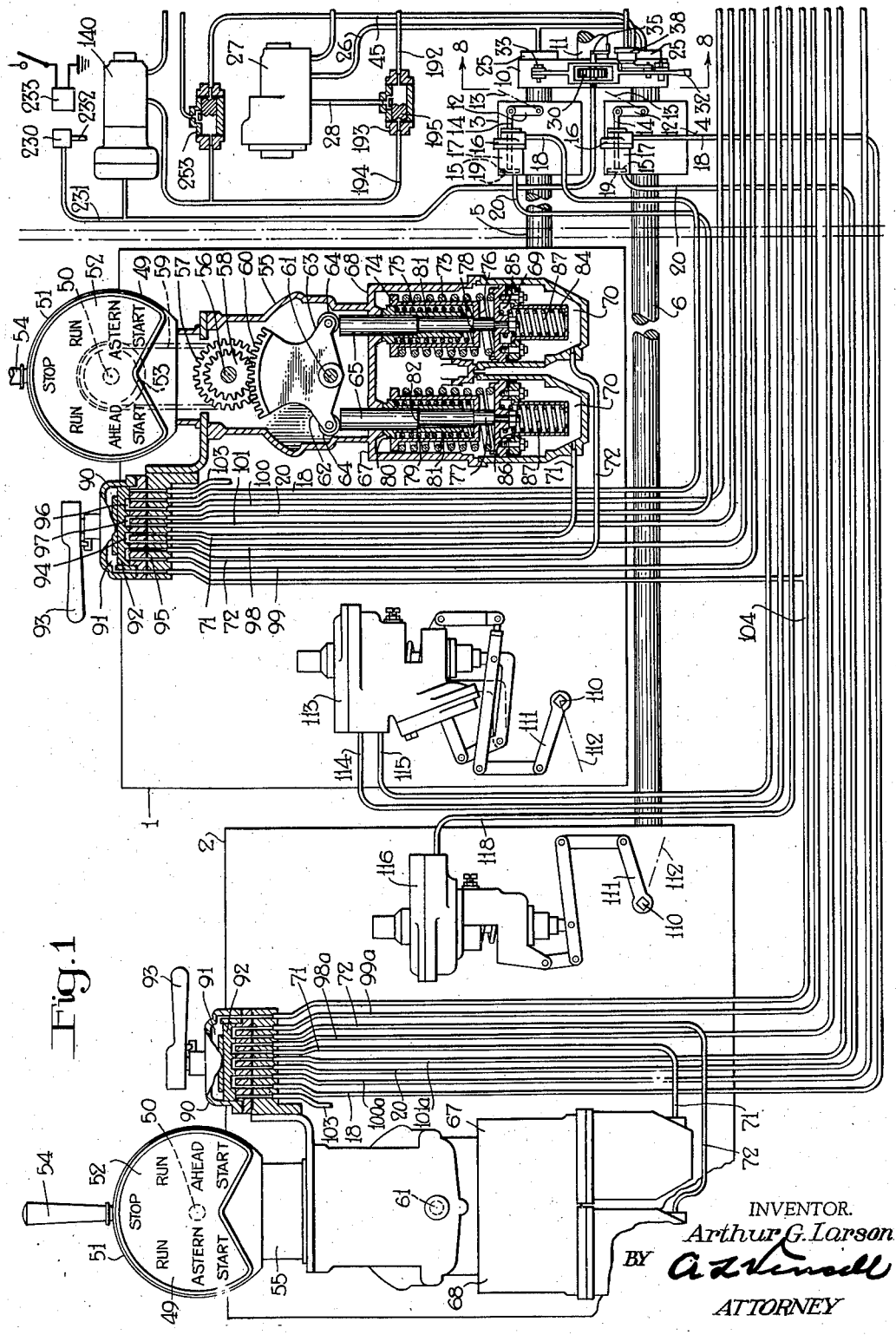

April 23, 1946.  A. G. LARSON  2,398,903
CONTROL APPARATUS
Original Filed Aug. 31, 1943  4 Sheets-Sheet 1

INVENTOR.
Arthur G. Larson
BY
ATTORNEY

April 23, 1946.  A. G. LARSON  2,398,903
CONTROL APPARATUS
Original Filed Aug. 31, 1943   4 Sheets-Sheet 2
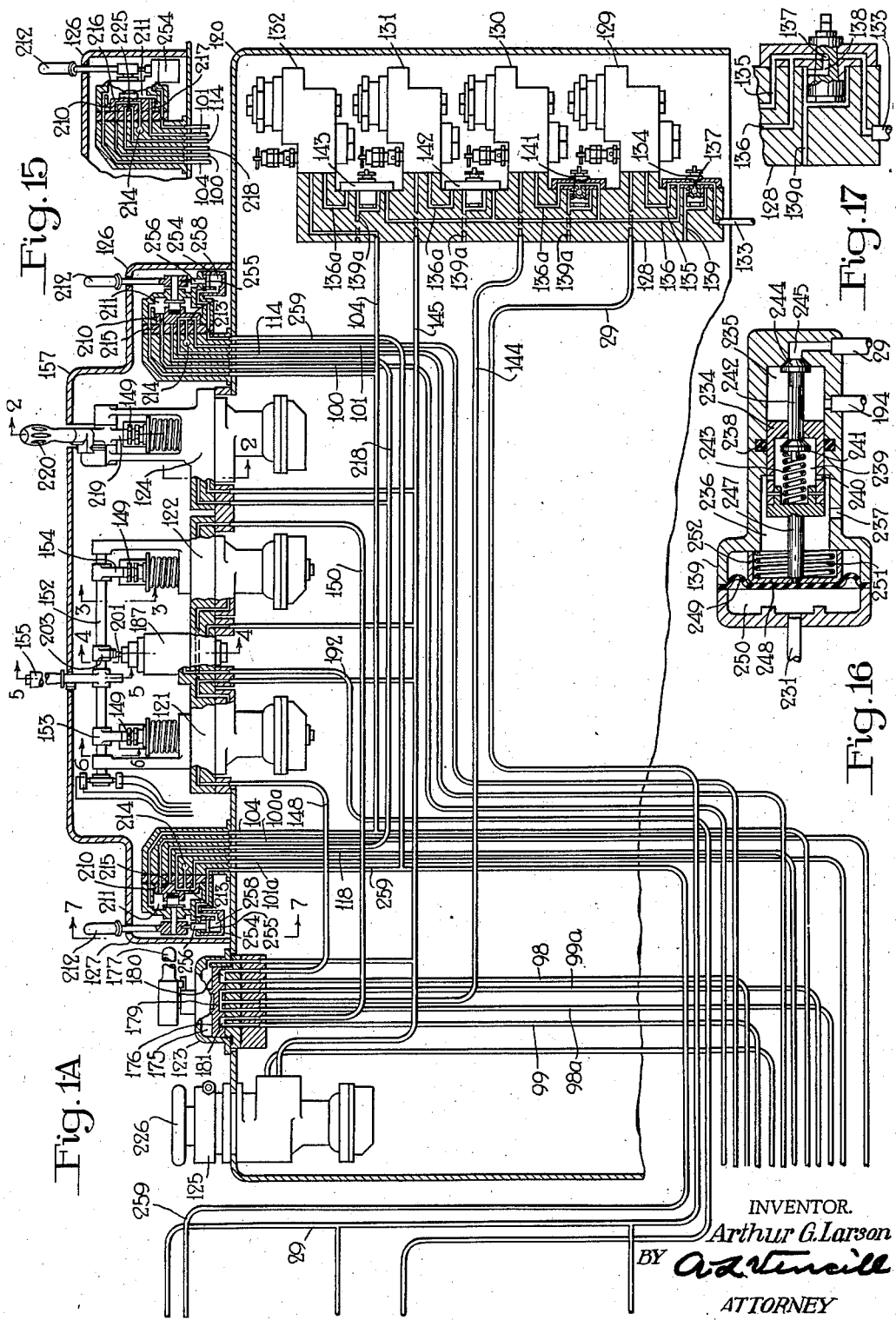
INVENTOR.
Arthur G. Larson
BY
ATTORNEY April 23, 1946.　　A. G. LARSON　　2,398,903
CONTROL APPARATUS
Original Filed Aug. 31, 1943　　4 Sheets-Sheet 3
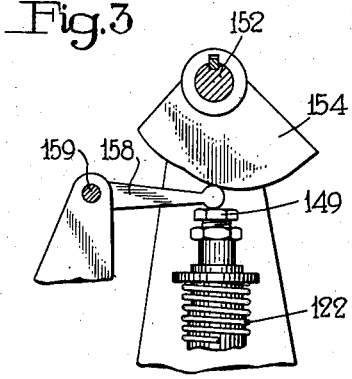
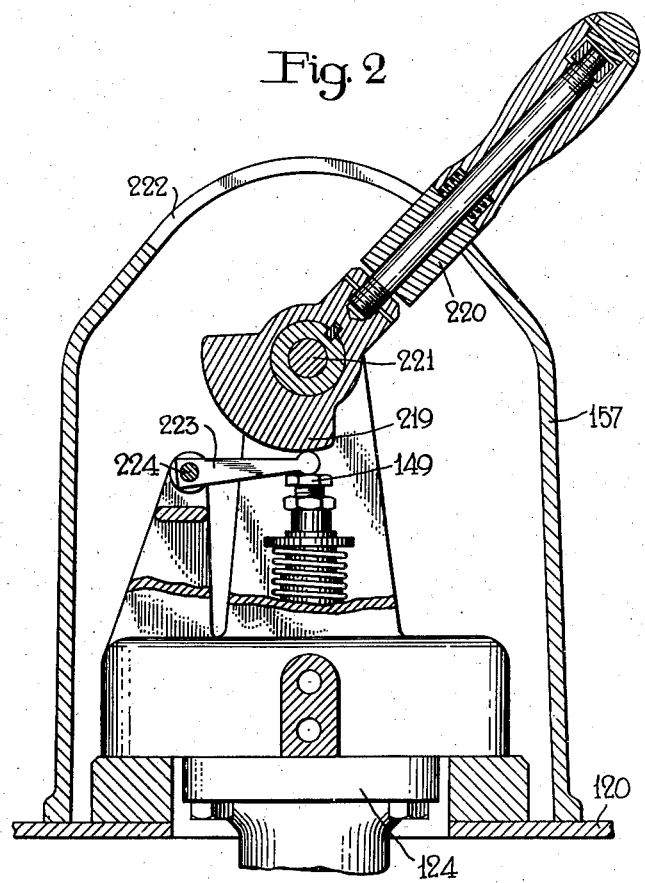
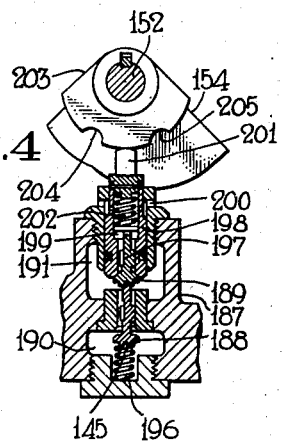
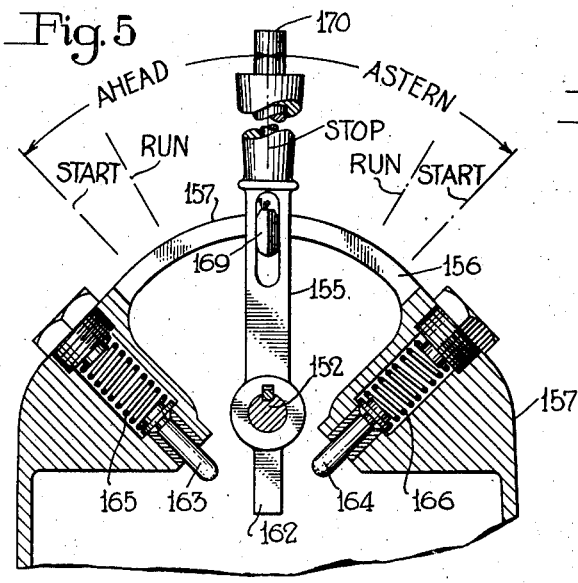
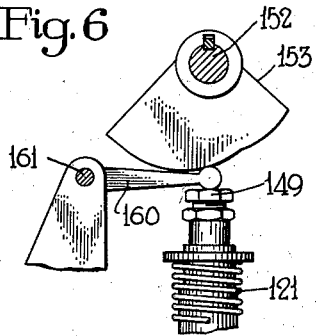
INVENTOR.
Arthur G. Larson
BY
ATTORNEY

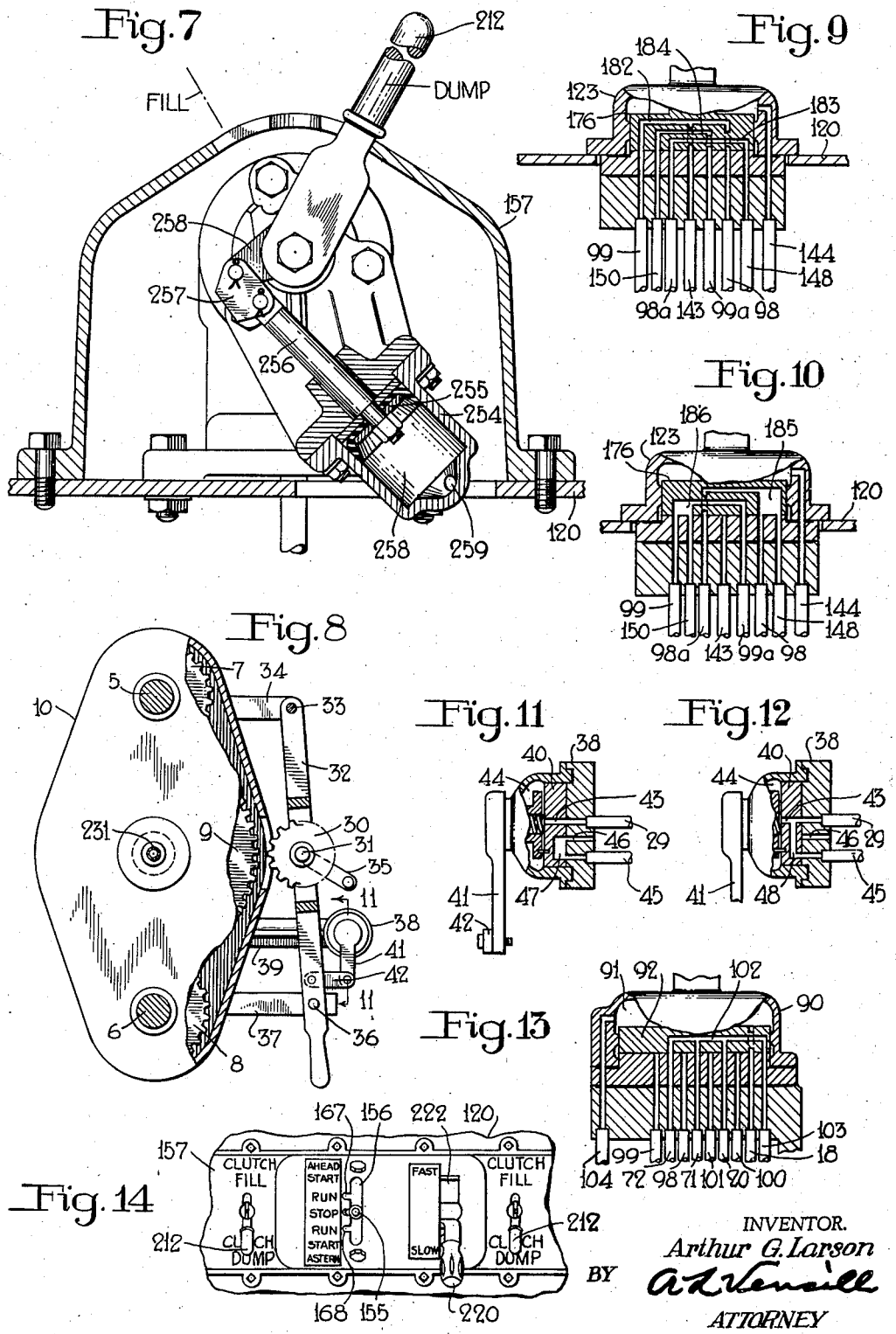

Patented Apr. 23, 1946

2,398,903

UNITED STATES PATENT OFFICE 2,398,903

CONTROL APPARATUS

Arthur G. Larson, Forest Hills, Pa., assignor to The Westinghouse Air Brake Company, Wilmerding, Pa., a corporation of Pennsylvania Original application August 31, 1943, Serial No. 500,630. Divided and this application July 12, 1944, Serial No. 544,584

14 Claims. (Cl. 192—.01)

This invention relates to control apparatus and more particularly to a propulsion system embodying a plurality of prime movers; the present application being a division of my copending application Serial No. 500,630, filed August 31, 1943.

On certain ships the propulsion system embodies a plurality of reversible engines of the Diesel type which are arranged to be connected through individual couplings and a pressure lubricated reduction gear to drive a propeller. Braking means are provided for braking the engines and propeller under certain conditions. The reduction gear is provided with what is called a turning gear which is operative manually for turning the gears in the reduction gear for the purpose of inspection.

One object of the invention is the provision of a control system which provides for selective control of the starting, stopping, reversing and speed of the engines, either individually or in multiple, and which also provides for controlling the couplings and braking means for the engines from a selected control station, such as the pilot house of a ship.

Another object of the invention is the provision of such a control system further embodying means which is operable in case of improper operation or failure of any individual engine to provide for disconnecting that engine from the reduction gear and to also provide for independent manual control of the disconnected engine without interfering in any way with operation of the other engine as controlled by the ship's pilot.

Another object of the invention is the provision of such a system embodying means for automatically causing the speed of any engine to reduce to idling upon rendering the respective coupling means ineffective, and which provides for acceleration of the engine only with the coupling means effective.

Another object of the invention is the provision of such a system embodying means to operate automatically in case the pressure of lubricant for the reduction gear reduces to a chosen low degree to render the coupling means ineffective so as to thereby disconnect the engines from the reduction gear and to at the same time brake said gear to stop same and to also reduce the speed of the engines to idling.

Another object of the invention is the provision of such a system embodying means which is operable upon manual operation of the turning gear, to disconnect the engines from the reduction gear and to reduce the speed of the engines to idling.

Other objects and advantages will be apparent from the following more detailed description of the invention:

In the accompanying drawings, Figs. 1—1A, when taken together in end-to-end relation with Fig. 1 at the left-hand side of Fig. 1A, is a diagrammatic view, partly in section and partly in outline of a propulsion control system embodying the invention; Figs. 2 to 8 are sectional views taken in Figs. 1—1A on lines 2—2 to 8—8 inclusive and respectively; Figs. 9 and 10 are diagrammatic sectional views of an engine selector valve device shown in section in Fig. 1A but with the valve of the device shown in two different positions than shown in Fig. 1A; Fig. 11 is a sectional view taken on a line 11—11 in Fig. 8 of a turning gear interlock valve device shown in plan in Fig. 8 and in side elevation in Fig. 1; Fig. 12 is a view similar to Fig. 11 but showing a valve in a different position; Fig. 13 is a diagrammatic sectional view of an engine room control valve device shown in section in Fig. 1, but with a valve in a different position; Fig. 14 is a partial plan view of an operator's or pilot's control stand shown in vertical cross-section in Fig. 1A; Fig. 15 is a diagrammatic sectional view of a coupling or clutch control valve device shown in section in Fig. 1A but with a valve in a different position; Fig. 16 is a longitudinal sectional view of an interlock valve device shown in side elevation in Fig. 1; and Fig. 17 is a sectional view of a cut-out cock shown in Fig. 1A in section but with the valve in a different position.

Description

Referring to Fig. 1, the reference numerals 1 and 2 indicate two reversible prime movers or engines of the Diesel type which are connected by shafts 5 and 6 and clutches, in the form of fluid couplings 3 and 4, to drive gears 7 and 8, respectively, and a meshing intermediate gear 9 (Fig. 8) in a reduction gear apparatus 10. The gear 9 is arranged to turn a drive shaft 11 to which may be connected a ship's propeller. By this arrangement the ship's propeller may be driven in either direction by both engines 1 and 2 when both couplings 3 and 4 are effective, or by either engine individually upon rendering the respective coupling effective and the other coupling ineffective, as will be apparent.

The fluid couplings 3 and 4 are arranged to be effective to transmit power when filled with liquid and ineffective when the liquid is drained therefrom. The filling of each coupling and the draining or dumping of liquid therefrom may be controlled by any conventional mechanism controlled by a lever 12 having a dump position in which it shown in Fig. 1 for draining liquid from the coupling, and having a fill position indicated by a dot and dash line 13 for filling the coupling with liquid.

The lever 12 for each coupling may be connected by a rod 14 to a piston 15 contained in a cylinder 16 secured to the coupling housing. The piston 15 has at one side a pressure chamber 17 connected to a dump pipe 18 and at the opposite side a pressure chamber 19 connected to a fill pipe 20. With chamber 17 filled with fluid under pressure supplied through pipe 18 and chamber 19 vented by way of pipe 20, the piston 15 and lever 12 will assume their dump position shown in the drawings, while with the pressure condition of these chambers reversed, the piston 15 will move lever 12 to the fill position indicated by dot and dash line 13. The means for controlling the supply of fluid under pressure to and its release from pipes 18 and 20 will be hereinafter described.

The reference numerals 25 indicate two independent brakes of any desired structure. These brakes are mounted on one side of the housing of reduction gear apparatus 10 and are arranged to be simultaneously operated by fluid under pressure supplied through a common pipe 26 to brake the power shaft 11 and propeller of the ship and also to brake either or both engines 1 and 2 according to whether the couplings 3 or 4, respectively, are effective or ineffective. The brakes 25 will be rendered ineffective upon release of fluid under pressure from pipe 26.

A relay valve device 27, arranged for control by pressure of fluid in a pipe 28, is provided for controlling the supply and release of fluid under pressure to and from the brake control pipe 26. The relay valve device 27 may be of any conventional structure which will operate upon supply of fluid under pressure to pipe 28 to open communication between a fluid pressure supply pipe 29 and the brake control pipe 26 to supply fluid under pressure to the latter, and which will also operate upon release of fluid under pressure from pipe 28 to close said communication and to open pipe 26 to atmosphere for releasing fluid under pressure from pipe 26 and thereby from both brakes 25. The means for controlling the supply and release of fluid under pressure to and from pipe 28 will be hereinafter described.

Associated with the reduction gear 10 is a manual turning device (Figs. 1 and 8) which for the purpose of illustration may comprise a gear 30 for meshing with gear 9. The gear 30 is carried by a shaft 31 which is supported in a lever 32. One end of lever 32 is fulcrumed on a pin 33 carried by a fixed bracket 34. Manual movement of the other end of the lever in a direction away from the reduction gear 10 will pull gear 30 out of mesh with gear 9, while movement in the opposite direction will move the gear 30 into mesh with gear 9. A hand operated crank 35 is connected to shaft 31 for turning gear 30 and thereby the gears 9, 7 and 8 when gears 9 and 30 are in mesh. A removable latch pin 36 is arranged to extend through the lever 32 into a fixed bracket 37 to support the lever in a normal position in which the gears 9 and 30 are out of mesh, as shown in Fig. 8 of the drawings.

An interlock valve device 38 is mounted on a bracket 39 projecting from the housing of the reduction gear 10. This valve device comprises a housing containing a rotary valve 40 (Figs. 11 and 12) having two operating positions and arranged to be turned to said positions by a lever 41 which is operatively connected by a link 42 to the turning gear lever 32.

The fluid pressure supply pipe 29 is open to the seat of rotary valve 40 at its axis and said valve is provided with a through port 43 providing a constantly open communication between said pipe and a chamber 44 wherein said pressure acts on the rotary valve to maintain same seated. Also opening to the seat of rotary valve 40 is a control pipe 45 and a passage 46 which is open to the atmosphere. The rotary valve 40 has a cavity 47 (Fig. 11) for connecting pipe 45 to passage 46 when the turning gear lever 32 is in the position shown in Fig. 8 in which the gear 30 is out of mesh with gear 9. The rotary valve also has a passage 48 connected to port 43 and arranged to register with control pipe 45 when the turning gear lever 32 is in the position meshing gear 30 with gear 9. It will thus be seen that when lever 32 is operated to mesh gear 30 with gear 9, fluid under pressure will be supplied from pipe 29 to pipe 45, while in the position shown in Fig. 8, in which said gears are out of engagement, pipe 45 will be vented to atmosphere. The purpose of this control will be hereinafter brought out.

Each engine is provided with a conventional so-called maneuvering gear which may comprise a rock shaft 50 arranged to control the starting, running, stopping and reversing of the engine. The shaft 50 of each engine extends into a housing 51 of a maneuvering gear actuator 49, an outer portion of said housing being in the form of a plate 52 mounted over the end of said shaft. A sprocket wheel 53 and hand operated lever 54 disposed back of the plate 52 are secured to shaft 50 for rocking same in either one direction or in the opposite direction from a neutral position shown. As indicated by legends applied to plate 52, the shaft 50 and thereby the sprocket wheel 53 and lever 54 of each engine have a neutral or "Stop" position, and at one or an "Ahead" side thereof, a "Run" position and a "Start" position, and at the opposite or an "Astern" side oppositely arranged "Run" and "Start" positions, the two "Run" positions being arranged between the "Stop" position and the two "Start" positions. With shaft 50 in "Stop" position the engine will be stopped, while rocking of shaft 50 in the direction indicated by the legend "Ahead" to the position indicated by legend "Start" will cause starting of the engine in a direction for propelling a ship forwardly. After the engine is thus started the shaft 50 will be rocked back to the adjacent "Run" position in which it will remain during running of the engine in this direction. Rocking of shaft 50 in the opposite direction from "Stop" position to the "Astern" "Start" position will cause starting of the engine in the reverse direction, while movement of the shaft back to the adjacent "Run" position will provide for running of the engine in the reverse direction. Rocking of shaft 50 from either "Run" position back to the "Stop" position will cause stopping of the engine. The specific means in the engines whereby starting, running, stopping and reversing of the engines is obtained is not pertinent to the invention and a description thereof is not therefore essential in the present application.

Secured to and depending from each maneuvering gear housing 51 is a power actuator housing 55 in which is journaled a shaft 56 which carries for rotation together a sprocket wheel 57 and a gear 58. The sprocket wheel 57 is aligned with sprocket wheel 53 and operatively connected thereto by means of a chain 59, while the gear 58 engages with a gear segment 60 which is journaled in housing 55 on a shaft 61. The gear segment 60 in each housing 55 has two oppositely extending arms 62 and 63, the ends of which are operatively connected through roller bearings 64 to the end of two piston rods 65 arranged in parallel spaced relation and associated with an ahead fluid motor 67 and an astern fluid motor 68, respectively.

The two fluid motors 67 and 68 associated with each engine are identical and each comprises a piston 69 to one side of which the respective piston rod 65 is connected and having at the opposite side a pressure chamber 70 to which fluid under pressure is adapted to be supplied for moving the piston in the direction of the gear segment 60 and from which fluid under pressure is adapted to be released to provide for movement of the piston in the opposite direction. Pressure chamber 70 in the ahead motor 67 is connected to an ahead control pipe 71, while the corresponding chamber in the astern motor is connected to an astern control pipe 72.

In each motor the rod 65 is encircled by a relatively heavy precompressed spring 73, one end of which bears against the piston 69. The opposite end of spring 73 is supported on an outturned flange 74 provided at one end of a sleeve 75 extending within the spring and having at its opposite end an inwardly extending flange 76 encircling a reduced portion 77 of the piston rod and arranged to cooperate with a shoulder 78 on the rod to limit expansion of the spring relative to the piston. Encircling piston rod 65 within sleeve 75 is a precompressed coil spring 79 bearing at one end against flange 76 on sleeve 75 and supported at the opposite end on a flange 80 having sliding contact with the interior of sleeve 75. Flange 80 is provided on one end of a sleeve 81 which is slidably mounted on piston rod 65 within the spring 79. Within sleeve 81 is a shoulder for engagement with a shoulder 82 on rod 65 to limit expansion of spring 79 relative to the piston while the opposite end of said sleeve is spaced from flange 76 on sleeve 75 with the parts positioned as shown in the drawings.

The precompressed force of spring 73 in each motor is greater than that of spring 79 and the distance between flange 76 on sleeve 75 and the end of sleeve 82, with the parts in the positions shown in Fig. 1, is such as to allow movement of the respective piston by fluid pressure acting in chamber 70 sufficient for turning the maneuvering gear shaft 50 from "Stop" position to one of the "Run" positions, this movement being transmitted from piston 69 through spring 73 and sleeve 75 to compress the lighter spring 79. After flange 76 on sleeve 75 engages the end of sleeve 81, further movement of piston 69 will be relative to sleeve 75 and against the opposing force of spring 73.

Projecting into pressure chamber 70 of each motor is a spring cage 84, one end of which is slidably mounted in a cavity 85 provided in piston 69. This end of the cage is provided with an annular shoulder 86 arranged to limit outward movement of the cage. The cage contains a precompressed spring 87, one end of which is supported by the piston at the bottom of cavity 85 while the opposite end engages the outer end of the spring cage 84. The spring cage 84 associated with each piston 69 projects from the piston, with shoulder 86 in contact therewith, a distance such as to engage the end of the casing or the closed end of pressure chamber 70 at the time the maneuvering gear shaft 50 is in a "Run" position or at the time the other piston 69 has moved sleeve 75 into engagement with the end of sleeve 81. Further movement of either piston 69 by fluid under pressure in chamber 70 will then be opposed by the respective spring 73 plus the additional force of spring 87 carried by the other piston.

In operation, when fluid at a certain pressure, such as 20 lbs. per square inch, is provided in a manner to be later described, through both pipes 71 and 72 in pressure chambers 70 in the ahead and astern motors 67 and 68 associated with each engine, such pressures acting on pistons 69 will move said pistons to the positions shown in Fig. 1, but not past these positions since this degree of pressure is inadequate to overcome the opposing force of springs 73. With the two pistons thus positioned the gear segment 60 and sprocket wheels 57 and 53 will also assume the positions shown in the drawings to position the maneuvering gear shaft 50 in "Stop" position.

If now it is desired to start engine 1 in an "Ahead" direction, the pressure of fluid in chamber 70 of the ahead motor 67 is increased to a chosen degree such as 100 lbs. while that in chamber 70 of the astern motor 68 is reduced to that of the atmosphere. This pressure of fluid acting on piston 69 in the ahead motor 67 then moves said piston initially against the respective spring 79 until flange 76 on sleeve 75 engages sleeve 82 and then against the combined forces on the respective spring 73 and of spring 84 acting on piston 69 in the astern motor 68, to a position which may be defined by engagement between the end of spring cage 87 in the astern motor with the bottom of cavity 85 in the respective piston 69. In this position of piston 69 in the ahead motor 67 the maneuvering gear shaft 50 will have been moved by gear segment 60 and the sprocket wheels and chain to its "Ahead" "Start" position for starting the engine in the selected direction to provide for ahead movement of the ship.

After the engine is thus started, the pressure of fluid in chamber 70 of the ahead motor 67 is reduced to a chosen lower degree such as 55 lbs., while said chamber in the astern motor 68 remains at atmospheric pressure. Upon this reduction in pressure in chamber 70 of the ahead motor, the combined force of spring 73 in said motor and of spring 87 in the astern motor 68 will move piston 69 in the ahead motor back to a position in which said springs become ineffective, and this movement will operate the gear segment 60 to turn the maneuvering gear shaft 50 from its "Ahead" "Start" position back to its "Ahead" "Run" position. The pressure of fluid now effective in chamber 70 of the ahead motor 67 exceeds however the opposing force of spring 79 by itself so that the parts of the two motors and thereby the maneuvering gear shaft 50 will remain in the "Run" position just described as long as chamber 70 in the astern motor 67 remains at atmospheric pressure. It should be noted that the maneuvering gear shaft 50 will not even move from this "Run" position in case of loss of fluid pressure in chamber 70 of the ahead motor 67 since under such a condition the piston rod 65 of said motor will be merely moved out of contact with arm 62 of the gear segment 60 by the respective spring 79.

In order to stop the engine the pressure of fluid in chamber 70 of the ahead motor will be reduced to the chosen degree of 20 lbs. before mentioned which will permit movement of the respective piston 69 back to the position shown in the drawings under the action of spring 79, and fluid at the same degree of pressure will be provided in chamber 70 of the astern motor 68 for thereby moving piston 69 therein to the position shown in the drawings. This movement of the astern piston 69 will rock the gear segment 60 and thereby turn the maneuvering gear shaft 50 from its "Ahead" "Run" position back to the "Stop" position in which the engine will be stopped.

If the operator now desires to start the engine in the astern direction, he opens chamber 70 in the ahead motor 67 to atmosphere and supplies fluid at the chosen maximum pressure, such as 100 lbs. per square inch, to said chamber in the astern motor 68. The astern motor will then operate in a manner which will be apparent from the above description to turn the maneuvering gear shaft 50 to the "Astern" "Start" position for causing starting of the engine in the reverse direction. After the engine is thus started, the pressure of fluid in chamber 70 of the astern motor 68 will be reduced to the lower degree of 55 lbs., while chamber 70 in the ahead motor 67 is maintained open to the atmosphere, and the pressure of spring 87 in the ahead motor 67 and of spring 73 in the astern motor will then turn the maneuvering gear shaft 50 back to the "Astern" "Run" position, also in the same manner as above described. The maneuvering gear shaft 50 will then remain in this "Run" position as long as chamber 70 in the ahead motor 67 is maintained open to the atmosphere, and even in case of loss of fluid under pressure from said chamber in the astern motor 68, as will be also apparent from the above description. In order to stop the engine 1, the pressure of fluid in chamber 70 of the astern motor 68 will be reduced to 20 lbs., while that in said chamber in the ahead motor 68 will be increased to the same pressure, and such pressure acting on piston 69 in the ahead motor will then actuate same to the position shown in the drawings for thereby moving the maneuvering gear shaft 50 to "Stop" position for stopping the engine.

In case there is no fluid pressure in either of the chambers 70 of the ahead and astern motors 67 and 68, the maneuvering gear shaft 50 may be manually turned to its different positions by operation of lever 54. It will however be noted that movement of this lever to the "Ahead" "Start" position will be opposed by spring 87 in the astern motor 68 whereby after the engine is started, the operator may release lever 54 and said spring will turn said lever and thereby the maneuvering gear shaft 50 to its "Ahead" "Run" position. In a like manner spring 87 in the ahead motor 67 will oppose movement of the lever 54 to the "Astern" "Start" position and upon removal of manual force on said lever will automatically return same and the maneuvering gear shaft 50 to the "Astern" "Run" position.

The control system further comprises for each engine an engineer's cut-out valve device 90 which is secured to the respective power actuator housing 55. Both cut-out valve devices 90 are identical in construction, each comprising a casing having a chamber 91 containing a rotary valve 92 having two operating positions; a pilot's control position shown in Fig. 1 and another position shown in Fig. 13. A hand operated lever 93 is connected to rotary valve 92 for turning same to its different positions. In Fig. 1, the two cut-out valve devices 90 are shown reversely arranged for mounting on the "Ahead" sides of the two power actuators 49 which are also reversely arranged with the two "Ahead" sides adjacent each other. This however is immaterial to the invention.

At each engine the pipes 71 and 72 connected to the respective ahead and astern motors 67 and 68 are connected to the seat of the respective rotary valve 92, as well as pipes 18 and 20 from the respective coupling cylinder 16. With rotary valve 92 of the cut-out valve device 90 associated with engine 1 in the pilot's control position shown in Fig. 1 the pipes 71 and 72, 18 and 20 are connected respectively, by cavities 94, 95, 96 and 97 in said rotary valve to pipes 98, 99, 100 and 101 which lead to operator's control devices (to be later described) located remotely, as in a pilot house of a ship, whereby the pilot may control operation of coupling 3 and of the maneuvering gear shaft 50 associated with the engine 1. The maneuvering gear control pipes 71 and 72 associated with engine 2 and the clutch control pipes 18 and 20 of coupling 4 are connected through corresponding cavities in the cut-out valve device 90 associated with engine 2, when in the pilot's control position shown in Fig. 1, to pipes 98a, 99a, 100a and 101a, corresponding respectively to pipes 98 through 101 above described, which also lead to the remotely located pilot's control devices.

In the other position of the rotary valve 92 of each of the cut-out valve devices 90 which position is shown in Fig. 13, the respective maneuvering gear control pipes 71 and 72 and the clutch control pipe 20 are opened to the atmosphere by way of a cavity 102 in the rotary valve 92 and thence through a pipe 103, while pipe 18 is connected by a cavity in the rotary valve to the rotary valve chamber 91 which is constantly supplied with fluid under pressure from a supply pipe 104.

Thus when the engineer turns the cut-out valve device 90 to the position shown in Fig. 13, the pilot's control connections to the respective actuator 49 and coupling 3 or 4 are broken and chambers 70 in both the ahead and astern motors 67 and 68 of said actuators are opened to the atmosphere thereby relieving the actuating pistons 69 of fluid pressure whereby the engineer by operation of lever 54 may position the maneuvering gear shaft 50, as desired. Also in the position of the rotary valves 92 shown in Fig. 13 fluid pressure supplied to rotary valve chamber 91 is supplied to the respective dump pipe 18 for thereby rendering the clutch 3 or 4 ineffective. The cut-out valve devices 90 are provided so that in case of trouble in either engine, such for instance as breakage of an oil line, the engineer may remove the control of the engine from the pilot in order to correct or repair the trouble, after which he may return the rotary valve of the cut-out valve to the position shown in Fig. 1 for thereby returning the control of the engine to the pilot.

Reference numeral 110 applied to each engine indicates a speed governor control shaft which is rockable to vary the amount of fuel supplied to the engine and thereby the speed or power output thereof. A lever 111 is connected at one end to shaft 110 for rocking same, said lever being shown in the drawings in the position for providing operation of the engine at an idling speed, and being rockable from this position to increase the speed or power output of the engine, a maximum speed or output being attained in a position such as indicated by a dash and dot line 112.

Associated with engine 1 is a speed regulating device 113 connected to lever 111 and arranged to operate in response to variations in pressure of fluid in a control pipe 114 to vary the position of the governor control shaft 110 in proportion to the pressure of such fluid. With the pipe 114 open to the atmosphere, in a manner to be later described, the lever 111 will assume the position shown in the drawings to provide for operation of the engine at idling speed. The speed regulating device 113 is also connected to a vernier control pipe 115 and embodies means responsive to variations in pressure of fluid in said pipe to modify an adjustment of lever 111 effective by pressure of fluid provided in pipe 114.

A speed regulating device 116 is associated with engine 2 for adjusting the position of the respective speed regulating lever 111 in accordance with variations in pressure of fluid in a pipe 118 corresponding to pipe 114 just described. The regulating device 116 is identical to the regulating device 113 except that it does not embody vernier control means like the latter, the function of the vernier control means associated with the device 113 being to effect minor adjustments in speed or power output of engine 1 with respect to that of engine 2 for synchronizing the two engines. The pipes 114 and 118 also lead to a remote control station such as the pilot house of the ship.

In Fig. 1A the reference numeral 120 indicates a control stand located at an operator's control station as in the pilot house of a ship. This stand comprises an ahead maneuvering control device 121, an astern maneuvering control device 122, and an adjustable selector valve device 123, said maneuvering control devices being provided for controlling operation of the ahead and astern motors 67 and 68 of either or both engines as determined by the adjustment of the selector valve device 123. The control stand further comprises a speed regulating device 124, a vernier speed regulating device 125, a clutch control valve device 126 for governing the coupling 3 of engine 1, and a clutch control device 127 for controlling the coupling 4. The control stand further comprises a manifold 128 upon which are mounted four separate and independent pressure regulating valve devices 129, 130, 131 and 132.

A pipe 133 connected to the manifold 128 is constantly supplied in use with fluid at any desired pressure in excess of the adjustment of any of the regulating devices just described, such for example as 190 lbs. A cut-out cock 134 in the manifold 128 controls communication between the fluid pressure supply pipe 133 and two passages 135 and 136 in the manifold. In the open position of cock 134, shown in Fig. 1A, a passage 137 in the cock opens this communication, while in a closed position of the cock shown in Fig. 17 this communication is closed and the passages 135 and 136 are both open to the atmosphere through a passage 138 in the cock and a passage 139a in the manifold.

Passage 135 leads to the pressure regulating device 129 which is adjusted to reduce the pressure of fluid supplied from pipe 133 to a chosen lower degree, such as 100 lbs., and to supply fluid at such reduced pressure to the fluid pressure supply pipe 29 leading to the brake relay valve device 27, to the turning gear interlock valve device 38 and to a turning gear lubricant interlock valve device 140 which will be later described.

Passage 136 supplied with fluid under pressure through the cut-out cock 134 is connected through other cut-out cocks 141, 142 and 143 to the regulating valve devices 130, 131 and 132 respectively. The cocks 141, 142 and 143 may be identical to the cut-out cock 134, each having an open position as illustrated in Fig. 1A, for supplying fluid under pressure from passage 136 to a passage 136a leading to the respective regulating valve device, and a closed position for closing such communication and for opening passage 136a to an atmospheric vent passage 139a.

The regulating valve device 130 is adjusted to reduce the pressure of fluid supplied through passage 136 to a degree such as 20 lbs. and to supply fluid at this reduced pressure to a pipe 144 leading to the selector valve device 123, while the regulating valve device 131 and 132 are so adjusted as to supply fluid from passage 136 to pipes 145 and 104, respectively, at pressures such as 100 lbs. The pipe 145 leads to the two maneuvering control devices 121 and 122, to the two speed control devices 124 and 125 and also to the selector valve device 123, while pipe 104 leads to the two clutch control devices 126 and 127 as well as to the two engine cut-out valve devices 90, as before mentioned.

The ahead maneuvering control device 121 is provided for supplying fluid at regulated pressure from pipe 145 to an ahead control pipe 148 and to release fluid under pressure from the latter pipe, and to this end may comprise a self-lapping valve structure of any suitable type having a plunger 149 which is displaceable into the structure to increase the pressure of fluid in pipe 148 and out of the structure to reduce such pressure to a degree dependent upon the extent of such displacement from a normal position in which pipe 148 will be open to atmosphere. A structure of this type is fully disclosed in the copending application of Roy R. Stevens and myself, Serial No. 494,612, filed July 14, 1943, and assigned to the assignee of the present application, in view of which a further description thereof is not deemed essential in the present application.

The astern maneuvering control device 122 is provided for supplying fluid at regulated pressure from pipe 145 to an astern control pipe 150 and for releasing fluid under pressure from the latter pipe, and may be identical in construction to the ahead control device 121.

A shaft 152 disposed above plungers 149 of the two maneuvering control valve devices 121 and 122 is suitably journaled at its opposite ends in the control stand. Two like but reversely arranged cams 153 and 154 are secured to turn with the shaft 152 over the plungers 149 of the two maneuvering control valve devices 121 and 122, respectively. An arm 158 pivoted at one end on a pin 159 (Fig. 3) carried by a bracket of the control stand has an opposite ball-like end interposed between the peripheral surface of cam 154 and the respective plunger 149, while a similar arm 160 pivoted on a pin 161 (Fig. 6) carried by a bracket in the control stand has its ball-like end interposed between the peripheral surface of cam 153 and plunger 149 of the ahead maneuvering control valve device 121. Between the two cams 153 and 154 an operating lever 155 is secured to the shaft 152 for turning same, said lever extending through a slot 156 in a cover 157 forming a part of the control stand.

The lever 155 has a vertical or stop position midway between the ends of the slot 156 and, as shown and indicated by legends in Fig. 5, is rockable from this "Stop" position in one or an "Astern" direction to first a "Run" position and then a "Start" position and in the opposite or an "Ahead" direction to oppositely arranged "Run" and "Start" positions.

Below the shaft 152 the lever 155 is provided with a depending arm 162 and aligned with opposite sides of said arm are two plungers 163 and 164 urged in the direction of the arm by springs 165 and 166, respectively. The plunger 163 is arranged for engagement by arm 162 when the lever 155 is in the "Astern" "Run" position and to oppose manual movement of said lever to the "Astern" "Start" position and to operate under the action of spring 165 to automatically return said lever from the "Astern" "Start" position to the "Astern" "Run" position upon removal of manual force on the lever 155. In a similar manner plunger 164 and spring 166 are provided for opposing manual movement of lever 155 from the "Ahead" "Run" position to the "Ahead" "Start" position and to automatically move said lever in the reverse direction to the "Ahead" "Run" position from the "Ahead" "Start" position upon removal of manual force from said lever.

The cover 157 is provided with two slots 167 and 168 opening to one side of slot 156 in the two "Run" positions of lever 155 (Fig. 14) for receiving a spring pressed detent or latch 169 carried in the lever for thereby locking said lever in either one or the other of the two "Run" positions. This latch is movable out of slot 167 or slot 168 by manual inward movement of an operating pin 170 projecting from the outer end of the lever. Outward movement of the latch 169 into slot 167 or slot 168 is automatic as by means of a spring not shown in the drawings.

With the operating lever 155 in "Stop" position, the two cams 153 and 154 are so arranged as to effect like degrees of displacement of the respective plungers 149 to thereby supply fluid at certain chosen and equal degrees of pressure, such as 20 lbs., to both the ahead and astern control pipes 148 and 150. The two cams 153 and 154 are so designed that upon movement of the lever 155 to the "Ahead" "Start" position the cam 153 will effect operation of the maneuvering control device 121 to supply fluid to pipe 148 at a certain maximum pressure, such for example as 100 lbs. or that provided by the pressure regulating valve device 131, while the cam 154 effects operation of the astern maneuvering control valve device 122 to open pipe 150 to the atmosphere. Movement of lever to the "Ahead" "Run" position will cause operation of the maneuvering control valve device 121 to provide fluid at a certain lesser pressure, such as 55 lbs., in the ahead control pipe 148 while at the same time the cam 154 will cause operation of the maneuvering control valve device 122 to maintain the astern control pipe 150 open to the atmosphere. Similarly, the two cams 153 and 154 will operate upon movement of lever 155 to the "Astern" "Start" position to provide fluid at 100 lbs. pressure in the astern control pipe 150 while opening the ahead control pipe 148 to the atmosphere, while movement of said lever to the "Astern" "Run" position will provide fluid in pipe 150 at a lesser degree of pressure such as 55 lbs. while maintaining pipe 148 open to the atmosphere.

The selector valve device 123 comprises a casing having a chamber 175 containing a rotary valve 176 having three different operating positions shown in the drawings in Figs. 1A, 9 and 10. The rotary valve 176 is connected to a hand operated lever 177 which is provided for turning said valve to its different positions. The rotary valve chamber 175 is constantly supplied with fluid under pressure from the supply pipe 145 which acts on said valve to maintain same in contact with its seat. Connected to the seat of the rotary valve 176 are pipes 98 and 99 which are normally open through cut-out valve device 90 associated with engine 1 to the ahead and astern motors 67 and 68 associated with said engine 1, and pipes 98a and 99a which are normally open through the cut-out valve device 90 associated with engine 2 to the motors 67 and 68 associated with engine 2. Also connected to the seat of the rotary valve 176 is the fluid pressure supply pipe 144 from the pressure regulating valve device 130 and the ahead and astern control pipes 148 and 150 from the ahead and astern maneuvering control valve devices 121 and 122.

With the rotary valve 176 of the selector valve device in the position shown in Fig. 1A, a cavity 179 therein connects the fluid pressure supply pipe 144 to pipes 98a and 99a which are normally open to the ahead and astern control motors 67 and 68 associated with engine 2 whereby fluid at the pressure supplied by the pressure regulating valve device 130 will be effective in chambers 70 of both of said motors. Since this pressure is 20 lbs. as above described, the pistons 69 in motors 67 and 68 associated with engine 2 will both move to the positions in which said pistons are shown in the motors associated with engine 1 to thereby maintain the maneuvering gear shaft 50 of engine 2 in its neutral or "Stop" position.

Also in this position of the selector valve rotary valve 176 shown in Fig. 1, the ahead and astern control pipes 98 and 99 connected to the ahead and astern motors 67 and 68 associated with engine 1 are connected by cavities 180 and 181 in said valve to pipes 148 and 150 leading to the ahead and astern maneuvering control valve devices 121 and 122, respectively. It will thus be seen that with the maneuvering control lever 155 in "Stop" position fluid at 20 lbs. pressure will be provided in chambers 70 of the ahead and astern control motors 67 and 68 associated with engine 1 for holding the maneuvering shaft 50 of said engine in "Stop" position. Movement of lever 155 to the "Ahead" "Start" position will then provide fluid at 100 lbs. pressure in chamber 70 of the ahead motor 67 associated with engine 1 while opening chamber 70 in the astern motor 68 to atmosphere to thereby cause starting of the engine 1 in an ahead direction. Return of lever 155 from the "Ahead" "Start" position to the "Ahead" "Run" position will reduce the pressure of fluid in chamber 70 of the ahead motor 67 associated with engine 1 to 55 lbs. while maintaining chamber 70 in the astern motor 68 open to the atmosphere whereby the maneuvering control shaft 50 in said engine will be moved to the "Ahead" "Run" position after the engine has been started. On the other hand movement of lever 155 to the "Astern" "Start" position and then to the "Astern" "Run" position will open chamber 70 of the ahead motor 67 associated with engine 1 to the atmosphere while providing fluid in chamber 70 of the astern motor 68 first at 100 lbs. pressure and then at 55 lbs. pressure to provide respectively for starting of engine 1 in the astern direction and for then moving the maneuvering control shaft 50 of said engine back to the "Astern" "Run" position.

It will thus be seen that with the selector valve device 123 in the position shown in Fig. 1A, the engine 1 may be started and run in either one direction or in the opposite direction in response to operation of the control lever 155, while the engine 2 may remain stopped.

In the position of the selector valve rotary valve 176 shown in Fig. 9, the ahead and astern control pipes 98 and 99 for engine 1 are both connected by a cavity 182 in the rotary valve to the fluid pressure supply pipe 143, whereby fluid at 20 lbs. pressure is provided in chambers 70 of the ahead and astern motors 67 and 68, respectively, of engine 1 to thereby maintain engine 1 stopped, while the ahead and astern control pipes 98a and 99a from engine 2 are connected respectively to pipes 148 and 150 leading to the ahead and astern maneuvering control valve devices 121 and 122, whereby upon operation of lever 155 the engine 2 can be started and then run in either the head or astern directions or stopped in a manner which will be apparent from the above description of the control of engine 1.

With the rotary valve 176 positioned as shown in Fig. 10, the ahead control pipes 98 and 98a from both engines 1 and 2 are connected by a cavity 185 in said valve to pipe 148 leading to the ahead maneuvering control device 121, while the astern control pipes 99 and 99a from both engines are connected by a cavity 186 to pipe 150 leading to the astern maneuvering control valve device 122. Thus with the rotary valve 176 in this position both of the engines 1 and 2 are rendered responsive to operation of lever 155 and may therefore be caused to start and run in unison in either direction or be stopped together, as will also be apparent from the above description.

It will now be seen that the two maneuvering control valve devices 121 and 122 as controlled by lever 155 provides for starting, running, reversing and stopping of either engine 1 or 2 individually or of both of said engines in unison, as determined by the position of rotary valve 176 in the selector valve device 123, and it will also be noted that with said rotary valve in the position in which it is shown in Fig. 1A, providing for operation only of engine 1, engine 2 will remain stopped, while in the position shown in Fig. 9, providing for operation of only engine 2, the engine 1 will remain stopped.

The control stand 120 also embodies a brake control valve device 187 comprising, as shown in Fig. 4, two axially aligned poppet valves 188 and 189 which are contained in chambers 190 and 191, respectively. Chamber 190 is open to a pipe 145 and thus constantly supplied with fluid under pressure from the regulating valve device 131, while chamber 191 is connected to a pipe 192 which leads to one end of a double check valve device 193 the side outlet of which is connected to pipe 28 leading to the brake control relay valve device 27. The opposite end of the double check valve device is connected to a pipe 194 leading to the lubricant interlock valve device 140.

The double check valve device 193 contains a double check valve 195 arranged to be operated by fluid pressure supplied through pipe 192 to close communication between pipes 194 and 28 and to open the latter to pipe 192, and to also be operated in case of supply of fluid to pipe 194 to open pipe 194 to pipe 28 and close communication between pipes 28 and 192, under conditions which will be later described.

The valve 188 in the brake control valve device 187 has a fluted stem extending through a bore connecting chambers 190 and 191 and engaging the valve 189 in the latter chamber, the valve 188 being provided for controlling flow of fluid from chamber 190 to chamber 191. A spring 196 in chamber 190 acts on the valve 188 urging it to a closed position.

The valve 189 has a fluted stem 197 on which is slidably mounted a plunger 198 arranged to seat against valve 189 to close communication between chamber 191 and a chamber 199 in the plunger which is open to the atmosphere through one or more ports 200. An operating member 201 is secured in the end of plunger 198 opposite valve 189 and interposed between this member within chamber 199 and the stem 197 of valve 189 is a spring 202 for urging the valve 189 out of seating engagement with the plunger.

The operating member 201 engages the peripheral surface of a cam 203 provided on the maneuvering valve control shaft 152 between cam 154 and lever 155. The cam 203 has two recesses 204 and 205, the recess 204 being so disposed as to receive the operating member 201 to allow movement of plunger 198 out of seating engagement with valve 189 when the maneuvering control lever 155 is in the "Ahead" "Run" position. The recess 205 is disposed to receive plunger 201 in the "Astern" "Run" position for allowing movement of plunger 198 out of seating engagement with the release valve 189. In all positions of the control lever 155 except the two "Run" positions the plunger 201 is adapted to be displaced by cam 203 into contact with valve 189 and to actuate said valve to open the valve 188. Thus, in all positions of the maneuvering control lever 155 except the two "Run" positions, in which either or both of the two engines may operate to propel the ship, fluid under pressure will flow past the valve 188 to chamber 191 and thence through pipe 192 and the double check valve device 193 to the brake relay valve device 27, for effecting operation thereof and thereby of the brakes 25 to brake the reduction gear 10. In either "Run" position, however, in which the valve 188 is closed and the valve 189 is open, fluid pressure will be released from the brake relay valve device 27 by way of pipes 28 and 192 whereby the brakes 25 on the reduction gear will be released in order to allow shaft 11 and the propeller connected thereto to be driven by either or both of the engines 1 and 2.

The two clutch control valve devices 126 and 127 may be of identical structure each comprising a rotary valve 210 contained in a chamber 211 and operatively connected for movement by a lever 212 which extends through a slot in the control stand cover 157. Chamber 211 is constantly supplied from pipe 104 with fluid under pressure supplied by the regulating valve device 132.

Each of the rotary valves 210 has two positions, one position as shown in Fig. 1A, while the other position of the rotary valve of the control device 126 is shown in Fig. 15. The other position of the rotary valve of the clutch control valve device 127 is the same as that shown in Fig. 15, but reversed. The position of the rotary valves 210 and levers 212 shown in Fig. 1A will be called dump position while the position shown in Fig. 15 will be called fill position.

In dump position of lever 212 and rotary valve 210 of the clutch control device 126, pipe 101 which is normally open through the cut-off valve device 99 of engine 1 to pipe 20 leading to the clutch cylinder 16 of coupling 3 is vented to the atmosphere through a cavity 213 in said rotary valve and an atmospheric port 214, while pipe 100 also normally open through said cut-off valve device and pipe 18 to said cylinder is supplied with fluid under pressure from the rotary valve chamber 211 through a port 215 in the rotary valve, whereby piston 15 in the clutch cylinder associated with the coupling 3 will be moved to the dump position shown in the drawings for rendering said coupling ineffective to transmit power. When the rotary valve 120 is turned by lever 212 to the fill position shown in Fig. 15, pipe 100 is opened to the atmospheric port 214 through a cavity 216 in the rotary valve, while pipe 101 is supplied with fluid under pressure from the rotary valve chamber 211 through a port 217 in the rotary valve to thereby actuate piston 15 in the cylinder device 16 to render the coupling 3 effective to transmit power. In a like manner and through cavities and ports bearing the same reference numerals the clutch control valve device 127 when in the dump position shown in Fig. 1A opens pipe 101a and thereby the normally connected pipe 20 of the clutch cylinder 16 associated with the coupling 4 to atmosphere and supplies fluid under pressure to pipe 100a and thereby pipe 18 for rendering said coupling ineffective, while in the fill position of the clutch control valve device 127 fluid under pressure is supplied to pipe 101a and released from pipe 100a to cause operation of piston 15 in the cylinder 16 associated with said coupling to render said coupling effective.

The speed regulating valve device 124 may comprise a self-lapping valve structure identical to that employed in the maneuvering control valve devices 121 and 122 and therefore embodying a displaceable control plunger 149. Movement of plunger 149 into the device will supply fluid to a speed control pipe 218, while movement out of the device will release fluid under pressure from said pipe to thereby vary the pressure of fluid in the pipe in proportion to the extent of movement out of a normal position in which it is shown in Figs. 1A and 2. In the normal position of plunger 149 of the speed control device 124 pipe 218 will be open to atmosphere.

Displacement of plunger 149 of the speed regulating device 124 is arranged to be controlled by a cam 219 provided on one end of a lever 220 which is journaled on a shaft 221 carried by a suitable bearing in the control stand. The lever 220 extends through a slot 222 in the cover 157 of the control stand for operation by the operator. An arm 223 pivotally supported at one end on a pin 224 carried by a suitable bracket in the control stand has at its opposite end a ball-like end interposed between and bearing at opposite sides against the peripheral surface of cam 219 and against plunger 149 of the speed regulating device. The cam 219 is so formed that with lever 220 in the position shown in Figs. 1A and 2 the plunger 149 will be displaced to its normal position for opening pipe 218 to atmosphere. Movement of lever 220 in a counterclockwise direction as viewed in Fig. 2 will displace the plunger 149 of the speed regulating device into said device for thereby supplying fluid to pipe 218 at a pressure proportional to the degree of movement of said lever away from normal position. Maximum pressure of fluid will be obtained in pipe 218 when lever 220 is at the end of slot 222 opposite that shown in Fig. 2. Return of lever 220 toward its normal position will reduce the pressure of fluid in pipe 218 to a degree proportional to the distance the handle is away from the position shown in Fig. 2, which may be called the engine idling position. It will thus be seen that in the idling position of lever 220 pipe 218 will be open to atmosphere while in any position out of idling position fluid will be provided in said pipe at a pressure proportional to the distance out of idling position.

The speed control pipe 218 leads to the seat of rotary valve 210 in both clutch control valve devices 126 and 127. With the clutch control valve devices 126 and 127 in dump position shown in Fig. 1A the rotary valves 210 therein lap the speed control pipe 218 and open pipes 114 and 118 from the speed regulating devices 113 and 116 to atmosphere by way of cavities 213 and ports 214 to thereby provide for operation of the engines at idling speed when the respective couplings 3 and 4 are ineffective. However in the fill position (Fig. 15) of the clutch control devices 126 and 127, the speed control pipe 218 is opened through cavities 225 in the rotary valves 210 to pipes 114 and 118 connected to the speed regulating devices 113 and 116, respectively. It will thus be seen that when the clutch control valve device 126 is in fill position rendering the coupling 3 effective, the speed regulating device 113 associated with engine 1 is connected to the speed control device 124 in the control stand whereby the speed of said engine may be regulated by operation of lever 220. Similarly, when clutch control device 127 is in its fill position rendering coupling 4 effective, the speed regulating device 116 associated with engine 2 is connected to the speed control device 124 at the control stand whereby the speed of said engine may also be regulated by operation of lever 220. With both clutch control valve devices 126 and 127 in their fill position, it will be apparent that the speed regulating devices 113 and 116 at both engines 1 and 2 will respond to operation of lever 220 whereby the speed of both engines may be adjusted in unison.

It will now be seen that the speed or power output of engines 1 and/or 2 is capable of control by the single speed regulating device 124 only when the clutch control valve devices 126 and 127 are in their fill positions, shown in Fig. 15, rendering the couplings 3 and/or 4 effective. When either or both clutch control devices is in the dump position (Fig. 1A), rendering coupling 3 or coupling 4 ineffective, the speed regulating device 113 or 116 of engines 1 or 2, respectively, is disconnected from the speed control pipe 218 to provide for operation of the engine at idling sped. Either or both of the couplings 3 or 4 may be thus rendered effective or ineffective and the engine or engines can be accelerated only when the respective coupling is effective.

The vernier control device 125 may be identical to the speed regulating device 124 except displacement of the plunger therein (not shown) may be controlled by a hand wheel 226 to vary pressure of fluid in pipe 115 connected to the speed regulating device 113 of engine 1 and which pipe is also connected to the vernier control device 125. While not pertinent to the invention, it will thus be seen that after adjustment of the regulating devices 113 and 116 on both engines by operation of the speed control lever 220 to provide for operation of both engines at approximately the same speed or power output, the speed or power output of engine 1 may be brought into exact synchronism with that of engine 2 by suitable adjustment of the vernier control valve device 125.

It will now be seen that in accordance with the adjustment of the selector valve device 123, either of the engines 1 or 2 may be independently started and run in either direction while the other engine remains stopped, or both engines may be simultaneously started and run in either and the same direction, by suitable operation of the maneuvering control lever 155. Regardless of the engine or engines operating, it will also be noted that the brake control valve device 187 causes operation of the brakes 25 to hold the propeller shaft 11 against rotation while the engines are stopped, while they are being decelerated for reversal and then subsequently started and provides for rotation of the propeller shaft only after the engine or engines have been started and the maneuvering control lever 155 has been moved to either "Run" position in which it will be carried while the engine or engines are operating. The clutch control valve device 126 renders coupling 3 for engine 1 effective when said engine is operating and ineffective at all other times, and also provides for acceleration of said engine only when coupling 3 is effective and thus prevents acceleration of said engine when its coupling is ineffective. In a like manner the clutch control device 127 provides the same control of coupling 4 for engine 2 and of the speed of said engine.

If when either engine is running or when both engines are running in the same direction, the operator desires to reverse same, he moves the maneuvering control lever 155 out of the "Run" position which it may be in, to the "Start" position at the opposite side of "Stop" position, and this movement causes operation of the brakes 25 to brake the propeller shaft 11 and through the couplings 3 and 4 to brake the engines for causing rapid deceleration thereof to attain rapid reversal, this being one purpose of the brakes. After the engine or engines are stopped and then started up in the reverse direction, the maneuvering control lever 155 is released and automatically moved by plunger 163 or 164 to the adjacent "Run" position in which the brakes 25 are automatically released to thereby provide for driving of the shaft 11 and propeller by the engine or engines which was reversed.

If one engine is driving the propeller shaft 11 and the other is stopped and it is desired to start the other engine and connect it also to the propeller shaft to drive same, the operator will turn the selector rotary valve 176 to the position shown in Fig. 10 for thereby opening pipes 98a and 99a or pipes 98 and 99 to pipes 148 and 150, respectively, to thereby cause operation of the ahead or astern motor 67 or 68 associated with engine 1 or 2, which is to be started, to cause movement of the maneuvering gear shaft 50 of said engine to the "Run" position corresponding to the position of the maneuvering control lever 155. With certain engines the coupling control device 126 or 127 may then be moved to the fill position to render the respective coupling 3 or 4 effective and the engine to be started would then be started by the other running engine or by the propeller. In other engines, however, it is necessary that the maneuvering shaft 50 be turned to the "Start" position, under the condition being considered the same as when starting the engine at any other time, and this may be effected in the present instance manually by operation of lever 54 in the engine room or it may be effected by the pilot by moving lever 155 from the "Run" position which it may be in to the adjacent "Start" position and then allowing the lever 155 to automatically return to said "Run" position.

In case the maneuvering shaft 50 of the engine being started is moved to its "Start" position by lever 54 such movement is opposed by spring 87 in either the ahead motor 67 or astern motor 68 of the respective engine and upon release of manual force on lever 54 after the engine is started said spring will automatically return lever 54 and thereby the maneuvering gear shaft 50 to its adjacent "Run" position.

After the engine being cut in is started as just described, the respective clutch control valve device 126 or 127 is moved to its fill position to thereby render the respective coupling 3 or 4 effective and to at the same time connect the respective speed regulating device 116 or 113 to the speed control device 124 whereby the speed of the newly started engine will be brought up to that of the engine previously operating.

If both engines 1 and 2 are operating to drive the propeller shaft 11 and the pilot desires to stop either engine, he moves the selector rotary valve 176 to the position shown in either Fig. 1A or Fig. 9, dependent upon the engine which he desires to stop, for thereby causing movement of the respective maneuvering gear shaft 50 to "Stop" position for stopping the engine. The pilot will also turn lever 212 of the clutch control device 126 or 127, dependent upon the engine which he is stopping, to its dump position shown in Fig. 1A for thereby rendering the coupling 3 or 4 of said engine ineffective and to at the same time disconnect the respective speed regulating device 113 or 116 from the speed control device 124 at the control stand.

As before mentioned, the reduction gear 10 is of the pressure lubricated type, that is, lubricant is supplied to the bearings therein under pressure and such supply may be provided by a pump 230 through a pipe 231. The pump 230 may draw its supply through a pipe 232 connected to an oil sump (not shown) and may be operated by an electric motor 233. According to the invention the lubricant interlock valve device 140 is connected for control to the lubricant supply pipe 231 leading to the reduction gear.

As shown in Fig. 16 the oil interlock valve device 140 may for the purpose of illustration comprise a casing having a bore in which is slidably mounted a plunger 234 having at one side a chamber 235 connected to pipe 194 leading to the double check valve device 195 and having at the opposite side a chamber 236 which is open to atmosphere through a port 237. Disposed in the casing around and having sealing sliding contact with the peripheral surface of plunger 234 is a sealing ring 238 for preventing leakage of fluid under pressure from chamber 235 past said plunger to chamber 236.

The plunger 234 has a chamber 239 open through one or more passages 240 to chamber 236 and containing a poppet valve 241 having a fluted stem 242 extending through a suitable axial bore in the end of said plunger into chamber 235. The plunger 234 is provided around stem 242 within chamber 239 with a seat for engagement by the valve 241 and a spring 243 in chamber 239 acts on the valve 241 for urging same toward its seat. In chamber 235 is a valve 244 which may be carried on the end of valve stem 242 to control communication between chamber 235 and a passage 245 which is open to the fluid pressure supply pipe 29. The pressure of spring 243 on valve 241 is sufficient to hold valve 244 seated against pressure of fluid in passage 245. Unseating of valve 244 may occur only upon movement of plunger 234 into contact with valve 241 and then further movement of said plunger and of valve 241 in the direction away from valve 244. A stem 247 secured at one end to plunger 234 and extending into chamber 236 has at the opposite end a follower 248 engaging one side a flexible diaphragm 249. The diaphragm has at the opposite side a chamber 250 open to the reduction gear lubrication supply pipe 231. A spring 251 in chamber 236 acts on the diaphragm 249 with a chosen degree of pressure.

When the pressure of lubricant supplied to the reduction gear 10 through pipe 231 and thereby effective in chamber 250 on diaphragm 249 exceeds a certain low degree, the spring 251 allows deflection of the diaphragm 249 in the direction of the right-hand as viewed in the drawings. This movement shifts sleeve 234 in the same direction due to which spring 243 acting on valve 241 to hold said valve seated urges said valve and the valve 244 in the direction of the right-hand until valve 244 is seated as shown in the drawings. Continued movement of plunger 234 by diaphragm 249 then moves said plunger away from the valve 241 for opening communication between pipe 194 and chamber 239 within the plunger so as to connect said pipe to the atmosphere past the valve 241. Deflection of the diaphragm 249 by pressure of lubricant in chamber 250 may be limited to opening of the valve 241 as just described by engagement between a flange 252 provided on the follower 248 and the casing. It will be noted that during the operation just described that valve 244 is seated before unseating of valve 241 to thereby prevent loss of fluid under pressure from pipe 29 to the atmosphere.

If for any reason the pressure of lubricant provided through pipe 231 to the reduction gear becomes reduced to below the chosen degree above mentioned, and as determined by the pressure of spring 251 on the diaphragm 249, said spring will deflect said diaphragm and cause movement of plunger 234 in the direction of the left-hand. This movement of plunger 234 is relative to valve 241 until it seats against same during which movement valve 244 is maintained seated by spring 243. After the plunger 234 moves into contact with valve 241 further movement thereof with diaphragm 249 in the direction of chamber 250 then pulls the valve 244 away from its seat to thereby allow fluid under pressure from supply pipe 29 to flow to pipe 194. The pressure of fluid thus supplied to pipe 194 flows to the double check valve device 193 where it acts to shift the double check valve 195 to the position opposite that shown in the drawings. Fluid pressure then flows from pipe 194 to pipe 28 and thence to the relay valve device 27 and effects operation thereof to apply the brakes 25 to the reduction gear 10 for stopping rotation of the parts of said gear and thereby of shaft 11. At the same time fluid under pressure supplied to pipe 194 also flows to a double check valve device 253, and through same to a pipe 259 which leads to the two clutch control valve devices 126 and 127.

Associated with each of the clutch control valve devices is a cylinder 254 containing a piston 255 which at one side has a stem 256 connected by a link 257 to an arm 258 (Fig. 7) associated with the clutch control valve device operating lever 212. The piston 255 in each of the cylinders 254 has at the opposite side a pressure chamber 258 to which pipe 259 is connected, it being noted that said pipe is connected to said chamber in both of the clutch control devices.

Each piston 255 and its connection with the respective clutch control lever 212 is so arranged that upon supply of fluid under pressure to pressure chamber 258 by way of pipe 259 such pressure acting on the piston 255 will move same in cylinder 254 to turn the clutch control lever 212 from the fill position to the dump position, in case it already is not in dump position as in case the respective engine might not be operative.

It will thus be seen that if the pressure of lubricant supplied through pipe 231 for lubricating the reduction gear 10 becomes reduced to a chosen low degree, below which it is not desired that the reduction gear be operated, the interlock valve device 140 will operate to cause operation of pistons 255 to move both clutch control devices 126 and 127 to their dump position to render both couplings 3 and 4 ineffective so as to disconnect the engines from the reduction gear and at the same time to cause operation of the brakes 25 to stop operation of the reduction gear. It will also be noted that upon such operation of the clutch control devices 126 and 127 the speed of the two engines will also be reduced to idling in case of previously operating at a greater speed.

When the pressure of lubricant supplied to the reduction gear 10 is at a safe chosen degree, the interlock valve device 140 will occupy the position shown in the drawings for opening pipe 194 to atmosphere to provide for a release of brakes 25 and a release of fluid under pressure from cylinders 254 associated with the two clutch control devices 126 and 127 in order that such devices may be manually operated to render the respective couplings 3 and 4 effective when so desired.

Pipe 45 connected to the turning gear interlock valve device 38 is also connected to the double check valve device 253 so that when the turning gear interlock valve device is operated upon manual movement of lever 32 to the position for meshing gears 9 and 30 fluid supplied to pipe 45 by said interlock valve device will flow to pipe 259 and thence to the two clutch interlock valve devices 126 and 127 for effecting automatic operation thereof to their dump positions to thereby render both couplings 3 and 4 ineffective for disconnecting the engines from the reduction gear during the manual operation of the reduction gear for inspection purposes above described.

The lubricant interlock valve device 140 is a protection device, as will be apparent, and it will seldom if ever operate. Likewise, the interlock valve device 38 associated with the reduction gear 10 will be operated only at infrequent intervals. It will thus be seen that fluid under pressure will seldom be supplied to chambers 258 to cause movement of pistons 255 associated with the two clutch control valve devices 126 and 127. Such infrequent operation of pistons 255 in the clutch interlock valve devices would not maintain the walls of the cylinders 254 in which the pistons operate properly lubricated and the pistons might become seized or rendered inoperative in a position in the cylinders adjacent the fluid pressure inlet pipes 259. To prevent such from occurring and to maintain the walls of the cylinders 254 engaged by the pistons lubricated and to maintain the pistons in proper working condition the connections between same and the clutch operating levers 212 are such that each time said levers are moved manually from one position to the other the pistons are caused to reciprocate in their cylinders.

*Summary*

It will now be seen that the control system provides for starting, running, stopping and reversing of two engines either individually or in unison. If both engines are operating in either and the same direction, either may be stopped at will, while in case only one of the engines is operating the other may at will be started and caused to operate in unison with the previously operating engine. The brakes are provided for causing rapid deceleration of the engine or engines when it is desired to reverse same and for holding the propeller shaft and reduction gear against rotation until the engine or engines are stopped and then started in the reverse direction, the brakes being released only in positions of the maneuvering control lever providing for running of the engines. The speed of the engines may also be controlled either individually or in unison according to whether one or both are operating. The couplings for connecting the engines to the reduction gear may be rendered either effective or ineffective at will and when ineffective the speed of the engine or engines is automatically reduced to idling. The engines can be accelerated only when the respective couplings are effective. The reduction gear is of the type having pressure lubricated bearings and means are provided responsive to the pressure of lubricant supplied to said bearings for automatically rendering the couplings of both engines ineffective and for at the same time causing operation of the brakes to stop rotation of the gears in the reduction gear in case the pressure of the lubricant becomes reduced to a dangerously low degree. Also associated with the reduction gear is what is called a turning gear, which provides for manual turning of the gears therein for visual inspection and an interlock valve device is associated with the turning gear for automatically rendering the couplings ineffective when the turning gear is being manually operated.

Having now described my invention, what I claim as new and desire to secure by Letters Patent is:

1. The combination with a propulsion system including a prime mover and a pressure lubricating system, of speed regulating means adjustable by fluid under pressure to vary the speed or power output of said prime mover in proportion to the pressure of such fluid, manually operable means for varying the pressure of fluid for controlling said speed regulating means, a device having one position for opening a fluid control communication between said manually operable means and speed regulating means and a second position for closing said communication and for releasing fluid under pressure from said speed regulating means, and interlock means responsive to pressure of lubricant in said system and operable upon a reduction in the lubricant pressure to a chosen low degree for moving said device to said second position and providing for movement of said device to said one position when the pressure of lubricant in said system exceeds said certain degree.

2. The combination with a propulsion system including a prime mover and a pressure lubricating system, of coupling means for transmitting power from said prime mover and rendered effective upon supply of fluid under pressure to one pipe and ineffective upon supply of fluid under pressure to a second pipe, manually controlled valve means having one position for supplying fluid under pressure to said one pipe and a second position for supplying fluid under pressure to said second pipe, interlock means responsive to pressure of lubricant in said lubricating system and operable upon a reduction in such pressure to a chosen low degree to effect movement of said valve means to its second position and providing for movement of said valve device manually to either position when the pressure in said lubricating system exceeds said low degree.

3. The combination with a propulsion system including a prime mover and a pressure lubricating system, of coupling means for transmitting power from said prime mover, braking means for braking said propulsion system, interlock means responsive to pressure of lubricant in said lubricating system, and means controlled by said interlock means operable upon operation of said interlock means in response to a reduction in such pressure to a chosen low degree to render said coupling means ineffective and to also effect operation of said braking means to brake said system.

4. The combination with a propulsion system including a prime mover and a pressure lubricating system, of speed regulating means adjustable to vary the speed or power output of said prime mover, manually operable means for controlling adjustment of said speed regulating means, coupling means for connecting said prime mover to a member to be driven, interlock means responsive to pressure of lubricant in said lubricating system, and means controlled by said interlock means operable upon response of said interlock means to a reduction in the pressure of lubricant to a chosen low degree to effect operation of said speed regulating means to reduce the speed of said prime mover and to also effect operation of said coupling means to disconnect said prime mover from said member.

5. The combination with a propulsion system including a prime mover and a pressure lubricating system, of speed regulating means adjustable by fluid under pressure to vary the speed or power output of said prime mover in proportion to the pressure of such fluid, manually operable means for varying the pressure of fluid on said speed regulating means, a manually movable device having one position for opening a fluid control communication between said manually operable means and speed regulating means and a second position for closing said communication and for releasing fluid under pressure from said speed regulating means, coupling means operable upon supply of fluid under pressure to one pipe to connect said prime mover to a member to be driven and upon supply of fluid under pressure to a second pipe to disconnect said prime mover from said member, said device in said one position being operable to supply fluid under pressure to said one pipe and in said second position being operable to supply fluid under pressure to said second pipe, interlock means responsive to pressure of lubricant in said lubricating system, and means controlled by said interlock means operable upon response of said interlock means to a chosen low lubricant pressure to effect movement of said device to said second position, and operable upon response of said interlock means to a lubricant pressure exceeding said chosen low pressure to provide for manual movement of said device to said one position.

6. The combination with a propulsion system including a prime mover and a pressure lubricating system, of speed regulating means adjustable to vary the speed or power output of said prime mover, manual means for controlling the adjustment of said speed regulating means, braking means for said propulsion system, interlock means responsive to pressure of lubricant in said lubricating system, means controlled by said interlock means operable upon response of said interlock means to a chosen low pressure of lubricant to effect operation of said speed regulating means to reduce the speed of said prime mover to idling and to also render said braking means effective, the last named means being operable upon response of said interlock means to pressure of lubricant exceeding said chosen low degree to provide for control of said speed regulating means by said manual means and to render said braking means ineffective.

7. The combination with a propulsion system including a prime mover and a pressure lubricating system, of speed regulating means adjustable to vary the speed or power output of said prime mover, coupling means for connecting said prime mover to a member to be driven, a brake for said propulsion system, interlock means responsive to pressure of lubricant in said lubricating system, means controlled by said interlock means operable upon response of said interlock means to a reduction in the pressure of lubricant to a chosen low degree to effect operation of said speed regulating means to reduce the speed of said prime mover, to render said coupling means ineffective and to render said braking means effective, the last named means being operable upon operation of said interlock means in response to pressure of lubricant above said chosen low degree to render said regulating means adjustable to accelerate said prime mover, to render said coupling means effective and to render said braking means ineffective.

8. The combination with a propulsion system including a prime mover and a pressure lubricating system, of coupling means for connecting said prime mover to a member to be driven, a manual control device for controlling said coupling means comprising a lever having one position for rendering said coupling means effective and a second position for rendering said coupling means ineffective, a movable abutment operable to move said lever from said one position to said second position when subject to fluid pressure and providing for manual movement of said lever to either position when not subject to fluid pressure, interlock means responsive to pressure of lubricant in said lubricating system, and means controlled by said interlock means operable upon response of said interlock means to a reduction in lubricant pressure to a chosen low degree to supply fluid under pressure to said abutment to actuate same and operable upon response of said interlock means to pressure of lubricant exceeding said chosen low degree to release fluid under pressure from said abutment.

9. The combination with a propulsion system including a prime mover and a pressure lubricating system, of coupling means for connecting said prime mover to a member to be driven, a manual control device for controlling said coupling means comprising a lever having one position for rendering said coupling means effective and a second position for rendering said coupling means ineffective, a movable abutment operable to move said lever from said one position to said second position when subject to fluid pressure and providing for manual movement of said lever to either position when not subject to fluid pressure, interlock means responsive to pressure of lubricant in said lubricating system, means controlled by said interlock means operable upon response of said interlock means to a reduction in lubricant pressure to a chosen low degree to supply fluid under pressure to said abutment to actuate same and operable upon response of said interlock means to pressure of lubricant exceeding said chosen low degree to release fluid under pressure from said abutment, and means connecting said abutment and lever providing for movement of said abutment by said lever upon movement of said lever to both of its positions.

10. The combination with a propulsion system including a prime mover and a pressure lubricating system, of speed regulating means adjustable by fluid under pressure to vary the speed or power output of said prime mover in proportion to the pressure of such fluid and to provide for operation of said prime mover at chosen low speed when not subject to pressure of fluid, manually operable means for controlling the pressure of fluid on said speed regulating means, coupling means for connecting and disconnecting said prime mover to and from a member to be driven and operable upon supply of fluid under pressure to one pipe to connect said prime mover to said member and upon supply of fluid under pressure to a second pipe to disconnect said prime mover from said member, a control device comprising a manually operable lever having one position for supplying fluid under pressure to said one pipe and another position for supplying fluid under pressure to said other pipe, said device also controlling communication between said speed regulating means and manually operable means and opening said communication in said one position and in said second position closing said communication and releasing fluid under pressure from said speed regulating means, a piston associated with said lever arranged to be operated by fluid under pressure to move said lever from said one position to said second position and providing for manual movement of said lever to either position when not subject to fluid pressure, interlock means responsive to pressure of lubricant in said lubricating system, and means controlled by said interlock means operable upon response of said interlock means to a reduction in lubricant pressure to a chosen low degree to supply fluid under pressure to said piston to effect operation thereof and operable when the pressure of lubricant exceeds said chosen low degree to release fluid under pressure from said piston to provide for manual movement of said lever to either position.

11. The combination with a propulsion system including a prime mover and a pressure lubricating system, of braking means for braking said system, coupling means for connecting and disconnecting said prime mover to and from a member to be driven, manually operable brake control means for rendering said braking means either effective or ineffective, manually operable coupling control means for rendering said coupling means either effective or ineffective, interlock means responsive to pressure of lubricant in said lubricating system and operable upon a reduction in pressure in said lubricating system to a chosen low degree for rendering said braking means effective and operable when such pressure exceeds said chosen low degree to provide for control of said braking means by said brake control means, said interlock means being also operative upon a reduction in lubricant pressure to said chosen low degree to effect operation of said manually operable coupling control means to render said coupling means ineffective and operable when the lubricant pressure exceeds said chosen low degree to provide for control of said coupling means by said manually operative coupling control means.

12. The combination with a propulsion system including a prime mover, a pressure lubricating system, and coupling means for transmitting power from said prime mover to drive a member to be driven, of a manual control device having one position for rendering said coupling means effective and a second position for rendering said coupling means ineffective, lubricant interlock means responsive to pressure of lubricant in said lubricating system and operable upon a reduction in such pressure to a chosen low degree to effect movement of said manual control device to said second position and providing for manual movement of said control device to either position when the pressure of lubricant in the system exceeds said chosen low degree, manually operable turning means associated with said member to be driven having a turning condition to provide for manual turning of said member, interlock means associated with said manually operable turning means operable upon said turning conditioning thereof to effect movement of said manual control device to said second position and operable when out of such turning condition to provide for manual movement of said manual control device to either of its positions, and means operable to render said lubricant interlock means effective to effect operation of said manual control device when the manually operable turning means is out of its turning condition and to render said manually operable turning means effective to effect operation of said manual control device when the pressure of lubricant in said lubricating system exceeds said low degree.

13. The combination with a propulsion system including a prime mover, a pressure lubricating system, and coupling means for transmitting power from said prime mover to drive a member to be driven, of a manual control device having one position for rendering said coupling means effective and a second position for rendering said coupling means ineffective, lubricant interlock means responsive to pressure of lubricant in said lubricating system and operable upon a reduction in such pressure to a chosen low degree to effect movement of said manual control device to said second position and providing for manual movement of said control device to either position when the pressure of lubricant in the system exceeds said chosen low degree, manually operable turning means associated with said member to be driven having a turning condition to provide for manual turning of said member, interlock means associated with said manually operable turning means operable upon said turning conditioning thereof to effect movement of said manual control device to said second position and operable when out of such turning condition to provide for manual movement of said manual control device to either of its positions, means operable to render said lubricant interlock means effective to effect operation of said manual control device when the manually operable turning means is out of its turning condition and to render said manually operable turning means effective to effect operation of said manual control device when the pressure of lubricant in said lubricating system exceeds said low degree, manually operable means for controlling the speed of said prime mover, said manual control device in said one position providing for control of speed of said prime mover by said manually operable means and in its second position rendering said manually operable means ineffective to control the speed of said prime mover and providing for reducing such speed to idling.

14. The combination with a propulsion system including a prime mover, a pressure lubricating system, and coupling means for transmitting power from said prime mover to drive a member to be driven, of a manual control device having one position for rendering said coupling means effective and a second position for rendering said coupling means ineffective, lubricant interlock means responsive to pressure of lubricant in said lubricating system and operable upon a reduction in such pressure to a chosen low degree to effect movement of said manual control device to said second position and providing for manual movement of said control device to either position when the pressure of lubricant in the system exceeds said chosen low degree, manually operable turning means associated with said member to be driven having a turning condition to provide for manual turning of said member, interlock means associated with said manually operable turning means operable upon said turning conditioning thereof to effect movement of said manual control device to said second position and operable when out of such turning condition to provide for manual movement of said manual control device to either of its positions, means operable to render said lubricant interlock means effective to effect operation of said manual control device when the manually operable turning means is out of its turning condition and to render said manually operable turning means effective to effect operation of said manual control device when the pressure of lubricant in said lubricating system exceeds said low degree, manually operable means for controlling the speed of said prime mover, said manual control device in said one position providing for control of speed of said prime mover by said manually operable means and in its second position rendering said manually operable means ineffective to control the speed of said prime mover and providing for reducing such speed to idling, braking means for braking said member, said lubricant interlock means being also operable upon the reduction in pressure of lubricant to said chosen low degree to effect operation of said braking means to brake said member and when the pressure of lubricant exceeds said low chosen degree to render said braking means ineffective, manually controlled means for also controlling the operation of said braking means, and means selectively operable to render either said lubricant interlock means or manually controlled means effective to control the operation of said braking means with the other conditioned to render the said braking means ineffective.

ARTHUR G. LARSON.